(12) United States Patent  
Kerekes

(10) Patent No.: US 7,866,541 B2
(45) Date of Patent: Jan. 11, 2011

(54) FISH COOLER WITH COUNTING MEANS

(76) Inventor: John Kerekes, 2536 York St., Toledo, OH (US) 43605

( * ) Notice: Subject to any disclaimer, the term of this patent is extended or adjusted under 35 U.S.C. 154(b) by 451 days.

(21) Appl. No.: 11/978,511

(22) Filed: Oct. 29, 2007

(65) Prior Publication Data

US 2009/0107165 A1 Apr. 30, 2009

(51) Int. Cl.
A63B 53/14 (2006.01)
(52) U.S. Cl. ......................... 235/1 B; 235/1 A
(58) Field of Classification Search ................. 235/1 B, 235/1 A
See application file for complete search history.

(56) References Cited

U.S. PATENT DOCUMENTS

| 752,600 | A | 2/1904 | Sinclair |
|---|---|---|---|
| 1,489,255 | A | 4/1924 | Lane |
| 4,008,540 | A | 2/1977 | Brower |
| 4,046,996 | A | 9/1977 | Williams et al. |
| 4,845,886 | A | 7/1989 | Robinson |
| 4,965,955 | A | 10/1990 | Campbell et al. |
| 5,107,990 | A * | 4/1992 | Wicherski et al. ........... 206/366 |
| 5,165,291 | A | 11/1992 | Galetto et al. |
| 5,388,547 | A | 2/1995 | Lehr et al. |
| 5,699,900 | A | 12/1997 | Artis |
| 5,941,016 | A | 8/1999 | Welcher |
| 6,155,398 | A | 12/2000 | Sagady |
| 6,634,722 | B1 | 10/2003 | Zheng et al. |
| 6,715,230 | B1 | 4/2004 | Klein |
| 6,758,006 | B1 | 7/2004 | Walls et al. |
| 6,765,155 | B1 | 7/2004 | Gray |
| 6,809,658 | B1 | 10/2004 | Lofaso |

* cited by examiner

*Primary Examiner*—Karl D. Frech
(74) *Attorney, Agent, or Firm*—Marshall & Melhorn, LLC

(57) ABSTRACT

A receptacle for receiving, counting and temporarily storing game, such as fish, has an opening or passageway into the interior of the receptacle. The opening or passageway is normally covered by a closure member or door which is selectively slidable between a normally closed position and an open position. Each time the door or closure member is substantially open, a counter will be indexed to indicate that a piece of game has been placed in the receptacle.

30 Claims, 2 Drawing Sheets

FISH COOLER WITH COUNTING MEANS

FIELD OF INVENTION

The present invention is concerned with a receptacle for retaining captured sporting game. More particularly the present invention shows a receptacle having a sliding door which when opened, will trigger a counter for counting the number of game placed in the receptacle. Most particularly the present invention deals with a insulated cooler having such a door into which fish are deposited and counted.

BACKGROUND OF THE INVENTION

It is common for gaming laws to limit and restrict the numbers of sporting game a sportsman may bag or obtain under a particular sporting game license. The sportsman is responsible for maintaining the number or quantity of sporting game he has bagged or caught during a particular outing, and if the sportsman exceeds the catch limit, the sportsman maybe liable for violation of gaming laws. Keeping track of the number of game caught is not a problem when larger game is involved. However, it does become a problem for smaller game, such as fish, in which the typical laws, as they apply to fishing, allow a fisherman to catch and retain a number of fish until the fishing outing is completed.

Especially with game such as fish, it is a problem to count the number of fish because of their very nature of them being slippery. When a fish is caught, a fisherman's hands are typically occupied with a fishing rod and reel in the one hand and the fish in the other. Therefore, a number of game counting receptacles have been placed on the market in order to make it easy for the fisherman to count the game.

U.S. Pat. No. 5,941,016 to William J. Welcher provides a game counting receptacle having an opening therein where a door is connected to the receptacle for movement between a closed position, wherein the door provides closure of the opening, and open position, wherein a passage way is formed through the opening and into the receptacle. The door is bias toward the closed position and operatively connected to a counter where in movement of the door from the closed position to the open position indexes the counter to provide a running count of the fish placed in the receptacle. While the Welcher receptacle works well enough, its relatively complicated construction and cost of manufacture have not permitted it to achieve wide spread acceptance among fisherman.

U.S. Pat. No. 5,388,547 discloses a fish score card for counting the number of fish caught during a fishing trip. Each time a fish is caught the fisherman places a peg in the appropriate hole of the appropriate row and column of the score card.

U.S. Pat. No. 1,489,255 shows a fishing creel having a spring loaded hinged door.

U.S. Pat. No. 6,758,006 discloses an electronic fishing information recording and storage device which attaches to a fishing rod and reel assembly. For each fish caught, the device is capable of recording relevant information about the type of fish. U.S. Pat. No. 6,765,155 discloses a fish measuring and weighing device.

For the reasons stated above, none of the prior art devices provide a satisfactory solution for counting fish as they are caught.

SUMMARY OF THE INVENTION

The present invention solves the problems present in the prior art by providing a receptacle for retaining and counting fish caught by the fisherman and placing it in a holding receptacle which is preferably insulated. There is provided a receptacle having an opening therein, and a door slideably moveable to open and close the opening, allowing access to the receptacle. A counter means is provided, along with a tripping means, such as a roller switch or other switch capable of operating the counter means. A down standing member mounted on the slideable door which protrudes into the opening, limits the length of movement of the door to substantially the length of the opening in the receptacle. At a time when the door is in a substantially open position, such as when a fisherman catches a fish, and wishes to deposit it, the down standing member will operate the tripping means and index the counter means, to show that a fish has been caught. The receptacle is preferably of the form of an insulated cooler, having a hinged lid to allow access to the interior of the cooler, and which is normally in its closed position while the fisherman is catching fish. The receptacle may also take the form of a live well or other receptacle suitable for retaining captured fish. The object of the present invention is to provide a new and improved fish counting receptacle for maintaining a running of count of the number of fish placed in the holding receptacle.

BRIEF DESCRIPTION OF THE DRAWINGS

The present invention may be understood by referring to the following detailed description and drawings, in which like reference numerals indicate corresponding parts in the several views.

While the present invention may be utilized in conjunction with the variety of different sporting game, the present invention is best suited for the counting of fish. Although, numerous configurations of the present invention are well within the scope of the present invention, in the preferred embodiment the fish counting receptacle 20 will have a base portion 22, and a lid 24, which is preferably hingedly mounted to the base portion 22. A handle 26 may be provided at either end of the base portion 22 for ease of carrying the fish counting receptacle 20.

Figure 1:
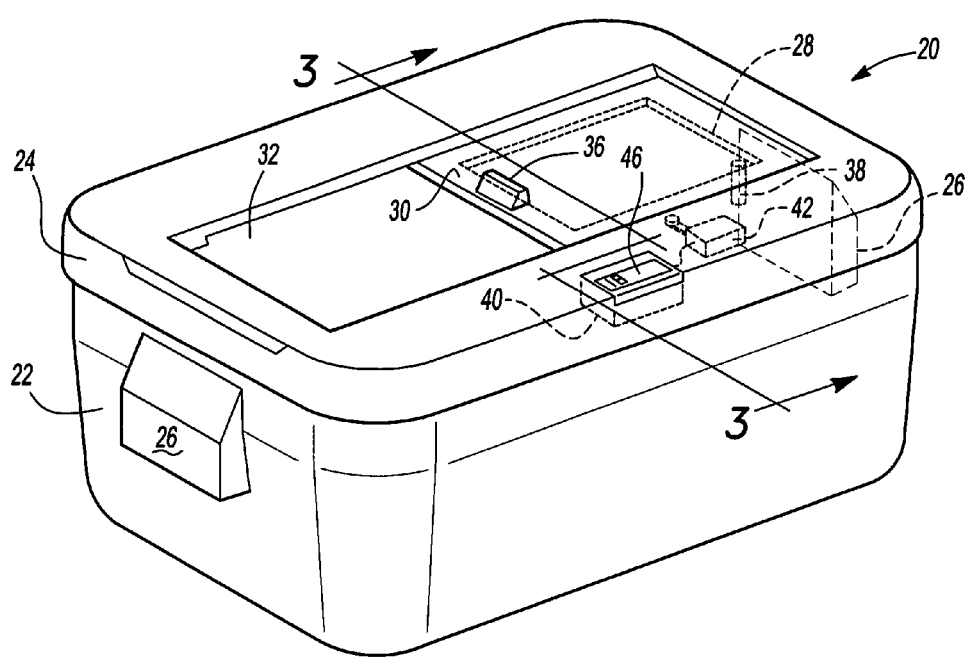
FIG. 1 is a perspective view of a construction embodying the present invention with the closure member or door in its closed position over the opening or passageway into the receptacle.
Figure 2:
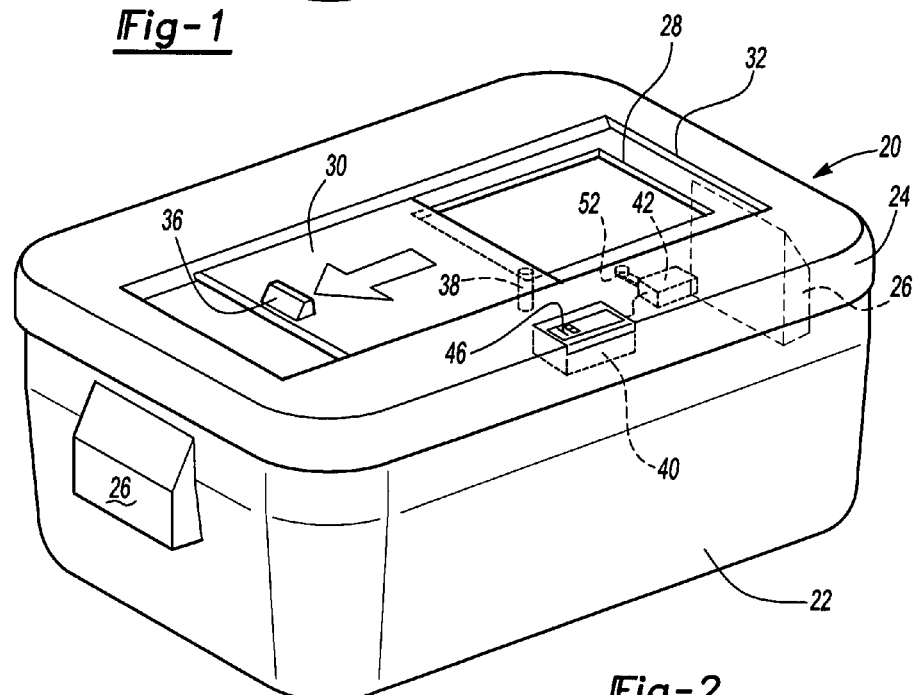
FIG. 2 is a perspective view, similar in large part to FIG. 1, but showing the closure or door member in its open position, and the opening or passageway uncovered.
Figure 3:
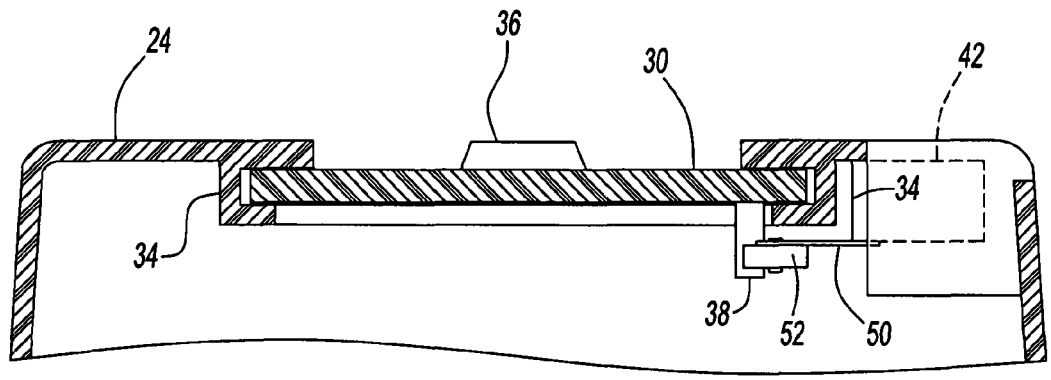
FIG. 3 is a sectional view, taken in the direction of the arrows, along the section line 3-3 of FIG. 1.
Figure 4:
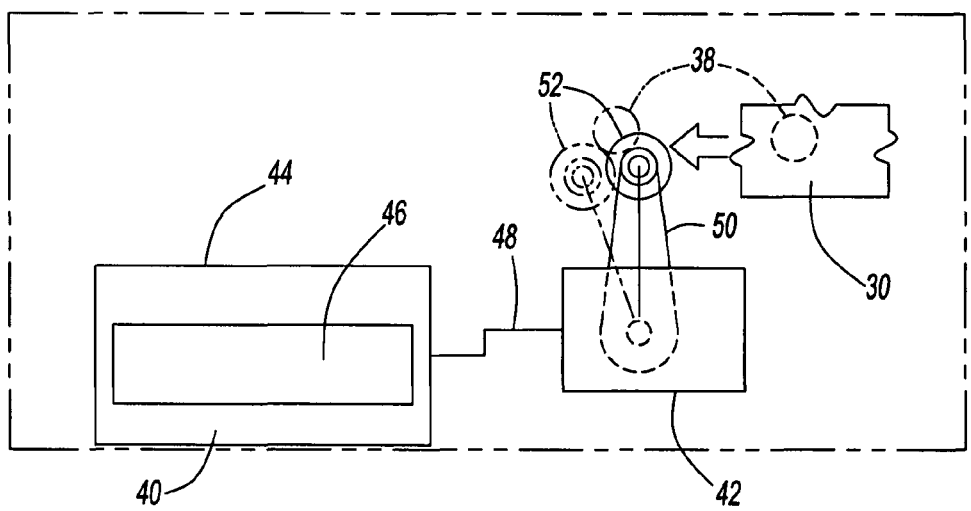
FIG. 4 is a diagrammatic view showing how the movement of the closure or door member operates a switch means to trigger the counter means.

An opening or passageway 28 is provided in the lid or cover 24 to provide access to the interior of the fish counting receptacle 20 when the lid 24 is closed. A closure member or door 30 is operatively mounted to selectively cover or uncover the opening or the passageway 28. The door 30 may be mounted on top of the lid 24 in tracks (not shown) mounted to the lid, slideably placed or held in a recess 32 in the lid 24 with integrally formed tracks as shown in FIGS. 1 and 2, or slideably mounted in a pair of tracks 24 (not shown) provided on the underside of the lid 24.

A protrusion or knob or handle 36 maybe provided on the door 30 to aide in sliding it back and forth over the opening or passageway 28. The handle 36 may be adapted for movement by, for example, a fisherman's elbow. This would permit the fisherman, while holding a fish, to open the door 30, count the fish, and then drop the fish into the receptacle 20. There is provided on the bottom or underside of the door 30 a down standing member 38. The down standing member 38 is preferably provided proximate one end of the closure member or door 30 in a position such that when the door 30 is in a predetermined closed position, the down standing member 38 will just be touching or close to touching one end of the opening or passageway 28, when the door 30 is in its closed position (FIG. 1), and will restrain the door 30 from opening a distance further than the liner distance between the ends of the opening 28, as shown in FIG. 2.

As part of the counting mechanism or means, there is supplied a counter 40 and a switch 42. The counter 40 is preferably of a digital electronic type having a body portion 44 and a display portion 46. Contained within the body portion 44 is a power source (not shown) to power the counter 40. If desired, the power source maybe external, but it is preferably contained with in the counter body portion 44 or nearby. Counter 40 is electrically connected to switch 42 by conductor 48. The switch 42 has an arm 50 which has attached to its distal end a roller 52.

Depending upon the particular application, the switch 42 may be placed in various locations proximate the opening 28, and the down standing member 38 may trigger the counter 42 each time it touches and moves past the roller 52, or it may be in a situation where the down standing member 38 and roller 52 are in an interfering position wherein the down standing member 38 will move the roller 52 to the position shown in phantom lines which will operate to send an electrical signal through conductor 48 to counter 40, and cause the display portion 46 to indicate a count. This flexibility of placement of the switch 42 and down standing member 38 makes possible several relative positions of the two items, and contributes to the easy and low cost of manufacture of the present invention. It can be understood by those of ordinary skill in the art that it is well within the scope of the invention to count each time the door or closure member is substantially closed, The counter means of the present invention may be electrical, such as the counter 40, or mechanical, and may be of any type of well known in the art which can be adapted to operate each time the down standing member 38 passes by a position certain. However, the counter is never operately connected to the door.

What is claimed is:

1. A game counting receptacle for counting and retaining game comprising:
   a) a receptacle having an opening therein;
   b) a closure member slidably mounted over the opening in the receptacle and movable between an open position, wherein the opening provides access to the interior of the receptacle, and a closed position, wherein the access is blocked; and,
   c) a counter means mounted to the receptacle and operable by the closure member to index each time the closure member is in a substantially open position.

2. The game counting receptacle of claim 1, wherein the receptacle comprises:
   a) an insulated cooler.

3. The game counting receptacle of claim 2, wherein the counter means comprises:
   a) a downstanding member mounted to the closure member and movable therewith;
   b) a switch operable by the downstanding member and electrically connected to the counter means.

4. The game counting receptacle of claim 3, wherein the counter means is an electrically triggered counter.

5. The game counting receptacle of claim 4, wherein the closure member comprises:
   a) a downstanding member mounted to the bottom of the closure member and extending into the opening to limit movement of the closure member.

6. The game counting receptacle of claim 5, wherein the downstanding member operates the switch each time the closure member is in a substantially open position and the downstanding member is proximate one end of the opening.

7. The game counting receptacle of claim 6, wherein the insulated cooler has a lid, and the opening is in the lid.

8. The game counting receptacle of claim 7, wherein the closure member is slidably mounted to the lid by a pair of tracks proximate the sides of the opening.

9. The game counting receptacle of claim 8, wherein the pair of tracks are integrally formed in the lid.

10. The game counting receptacle of claim 9, wherein the electrically triggered counter is battery powered.

11. A game counting receptacle for counting and retaining game comprising:
    a) a receptacle having an opening therein;
    b) a closure member slidably mounted over the opening in the receptacle and movable between an open position wherein the opening provides access to the interior of the receptacle, and a closed position wherein the access is blocked;
    c) a counter mounted to the receptacle and operable by the closure member to index each time the closure member is in a substantially open position, the counter being electrically connected to a switch mounted proximate the opening.

12. The game counting receptacle of claim 11, wherein the receptacle comprises:
    a) an insulated cooler.

13. The game counting receptacle of claim 12, wherein the counter means is an electrically triggered counter.

14. The game counting receptacle of claim 13, wherein the closure member comprises:
    a) a downstanding member mounted to the bottom of the closure member and extending into the opening to limit movement of the closure member to a distance equal to the length of the opening.

15. The game counting receptacle of claim 14, wherein the switch is a cam and roller switch mounted proximate one side of the opening and the downstanding member contacts and moves the roller to index the counter.

16. The game counter receptacle of claim 15, wherein the downstanding member operates the switch each time the closure member is in a substantially open position and the downstanding member is proximate one end of the opening.

17. The game counting receptacle of claim 16, wherein the insulated cooler has a lid, and the opening is in the lid.

18. The game counting receptacle of claim 17, wherein the closure member is slidably mounted to the lid by a pair of tracks proximate the sides of the opening.

19. The game counting receptacle of claim 18, wherein the pair of tracks are integrally formed in the lid.

20. The game counting receptacle of claim 19, wherein the electrically triggered counter is battery powered.

21. A counting receptacle for counting and retaining fish comprising:
    a) a receptacle having an opening therein;
    b) a closure member having a downstanding member fixedly mounted thereto slidably mounted over the opening in the receptacle with the downstanding member extending into the opening, the closure member movable between an open position wherein the opening provides access to the interior of the receptacle, and a closed position wherein the access is blocked;

c) an electrical counter mounted to the receptacle and operable by the closure member to index each time the closure member is in a substantially open position, the counter being electrically connected to a roller switch mounted proximate the opening.

22. The game counting receptacle of claim 21, wherein the receptacle comprises:

a) an insulated cooler.

23. The game counting receptacle of claim 22, wherein the counter means is an electrically triggered counter.

24. The game counting receptacle of claim 23, wherein the closure member comprises:

a) a downstanding member mounted to the bottom of the closure member and extending into the opening to limit movement of the closure member to a distance equal to the length of the opening.

25. The game counting receptacle of claim 24, wherein the switch is a cam and roller switch mounted proximate one side of the opening, and the downstanding member contacts and moves the roller to index the counter.

26. The game counting receptacle of claim 25, wherein the downstanding member operates the switch each time the closure member is in a substantially open position and the downstanding member is proximate one end of the opening.

27. The game counting receptacle of claim 26, wherein the insulated cooler has a lid, and the opening is in the lid.

28. The game counting receptacle of claim 27, wherein the closure member is slidably mounted to the lid by a pair of tracks proximate the sides of the opening.

29. The game counting receptacle of claim 28, wherein the pair of tracks are integrally formed in the lid.

30. The game counting receptacle of claim 29, wherein the electrically triggered counter is battery powered.

* * * * *